United States Patent
Zhang et al.

(10) Patent No.: US 11,816,549 B2
(45) Date of Patent: Nov. 14, 2023

(54) ASYNCHRONOUS GRADIENT WEIGHT COMPRESSION

(71) Applicant: International Business Machines Corporation, Armonk, NY (US)

(72) Inventors: Wei Zhang, Elmsford, NY (US); Chia-Yu Chen, Westchester, NY (US)

(73) Assignee: International Business Machines Corporation, Armonk, NY (US)

(*) Notice: Subject to any disclaimer, the term of this patent is extended or adjusted under 35 U.S.C. 154(b) by 845 days.

(21) Appl. No.: 16/204,770

(22) Filed: Nov. 29, 2018

(65) Prior Publication Data
US 2020/0175422 A1 Jun. 4, 2020

(51) Int. Cl.
G06N 3/098 (2023.01)
G06N 20/20 (2019.01)
G06N 7/08 (2006.01)

(52) U.S. Cl.
CPC ............ G06N 20/20 (2019.01); G06N 3/098 (2023.01); G06N 7/08 (2013.01)

(58) Field of Classification Search
CPC ................................ G06N 20/20; G06N 7/08
See application file for complete search history.

(56) References Cited

U.S. PATENT DOCUMENTS

| 2016/0063145 A1 | 3/2016 | Chang et al. |
| 2017/0098171 A1 | 4/2017 | Kumar et al. |
| 2018/0336076 A1* | 11/2018 | Lim ...................... G06N 20/00 |

OTHER PUBLICATIONS

Dean et al., Large Scale Distributed Deep Networks, NIPS'12: Proceedings of the 25th International Conference on Neural Information Processing Systems, vol. 1, pp. 1223-1231, Dec. 2012. (Year: 2012).*

Zhang et al., Staleness-aware Async-SGD for Distributed Deep Learning, 7 pages, Apr. 2016. (Year: 2016).*

Wen et al., TernGrad: Ternary Gradients to Reduce Communication in Distributed Deep Learning, 31st Conference on Neural Information Processing Systems (NIPS 2017), pp. 1-13, Dec. 2017. (Year: 2017).*

Zhang, et al., Staleness-aware Async-SGD for Distributed Deep Learning, Apr. 5, 2016, 7 Pages.

Gu, et al., Recent Advances in Convolutional Neural Networks, Oct. 19, 2017, 38 Pages.

(Continued)

*Primary Examiner* — Marshall L Werner
(74) *Attorney, Agent, or Firm* — Amin, Turocy & Watson, LLP

(57) ABSTRACT

Systems, computer-implemented methods, and computer program products to facilitate gradient weight compression are provided. According to an embodiment, a system can comprise a memory that stores computer executable components and a processor that executes the computer executable components stored in the memory. The computer executable components can comprise a pointer component that can identify one or more compressed gradient weights not present in a first concatenated compressed gradient weight. The computer executable components can further comprise a compression component that can compute a second concatenated compressed gradient weight based on the one or more compressed gradient weights to update a weight of a learning entity of a machine learning system.

19 Claims, 12 Drawing Sheets

(56) References Cited

OTHER PUBLICATIONS

Chen, et al., AdaComp: Adaptive Residual Gradient Compression for Data-Parallel Distributed Training, Dec. 7, 2017, 9 Pages.
Nair, et al., Wildfire: Approximate synchronization of parameters in distributed deep learning, IBM Journal of Research and Development, Jul. 2017, 9 Pages, vol. 61, No. 4/5.
Chilimbi, et al., Project Adam: Building an Efficient and Scalable Deep Learning Training System, Proceedings of the 11th USENIX Symposium on Operating Systems Design and Implementation, Oct. 6, 2014, pp. 571-582.
Seide, et al., 1-Bit Stochastic Gradient Descent and its Application to Data-Parallel Distributed Training of Speech DNNs, Interspeech, 2014, 5 Pages.
Dean, et al., Large Scale Distributed Deep Networks, Advances in Neural Information Processing Systems 25 NIPS, 2012, 9 Pages.
Mel, et al., The NIST Definition of Cloud Computing, National Institute of Standards and Technology Special Publication 800-145, Sep. 2011, 7 Pages.
Wen, et al., TernGrad: Ternary Gradients to Reduce Communication in Distributed Deep Learning, Dec. 2017, 13 pages.

\* cited by examiner $$202 \longrightarrow \underbrace{\nabla W(i) = \frac{1}{\lambda} \sum_{l=1}^{l=\lambda} \nabla W_l(i)}$$

$$204 \longrightarrow W(i+1) = W(i) - \alpha \nabla W(i)$$

Equivalent to single-learner Stochastic Gradient Descent with batch size of $\lambda * \mu$

802 — Identifying, by a system operatively coupled to a processor, one or more compressed gradient weights not present in a first concatenated compressed gradient weight 804 — Computing, by the system, a second concatenated compressed gradient weight based on the one or more compressed gradient weights to update a weight of a learning entity of a machine learning system

FIG. 8

ASYNCHRONOUS GRADIENT WEIGHT COMPRESSION

BACKGROUND

The subject disclosure relates to distributed machine learning systems, and more specifically, to asynchronous gradient weight compression in a distributed machine learning system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate gradient weight compression are described.

According to an embodiment, a system can comprise a memory that stores computer executable components and a processor that executes the computer executable components stored in the memory. The computer executable components can comprise a pointer component that can identify one or more compressed gradient weights not present in a first concatenated compressed gradient weight. The computer executable components can further comprise a compression component that can compute a second concatenated compressed gradient weight based on the one or more compressed gradient weights to update a weight of a learning entity of a machine learning system.

According to another embodiment, a computer-implemented method can comprise identifying, by a system operatively coupled to a processor, one or more compressed gradient weights not present in a first concatenated compressed gradient weight. The computer-implemented method can further comprise computing, by the system, a second concatenated compressed gradient weight based on the one or more compressed gradient weights to update a weight of a learning entity of a machine learning system.

According to yet another embodiment, a computer program product that can facilitate a gradient weight compression process is provided. The computer program product can comprise a computer readable storage medium having program instructions embodied therewith, the program instructions can be executable by a processing component to cause the processing component to identify, by the processor, one or more compressed gradient weights not present in a first concatenated compressed gradient weight. The program instructions can further cause the processing component to compute, by the processor, a second concatenated compressed gradient weight based on the one or more compressed gradient weights to update a weight of a learning entity of a machine learning system.

DESCRIPTION OF THE DRAWINGS

FIG. 2 illustrates an example, non-limiting system that can facilitate gradient weight compression components in accordance with one or more embodiments described herein.

FIG. 8 illustrates a flow diagram of an example, non-limiting computer-implemented method that can facilitate gradient weight compression components in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
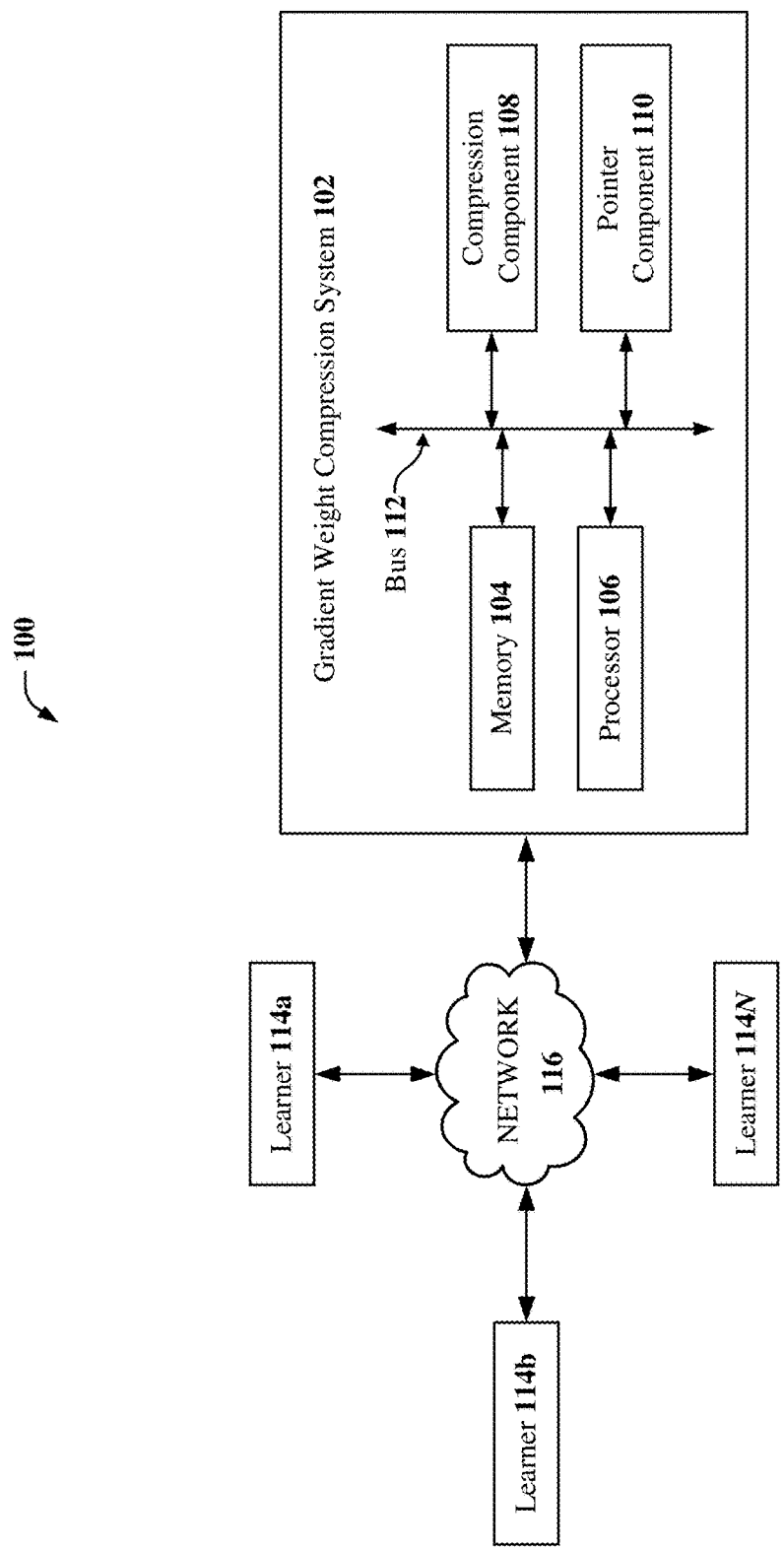
FIG. 1 illustrates a block diagram of an example, non-limiting system that can facilitate gradient weight compression components in accordance with one or more embodiments described herein.

FIG. 1 illustrates a block diagram of an example, non-limiting system 100 that can facilitate gradient weight compression components in accordance with one or more embodiments described herein. In some embodiments, system 100 can comprise a gradient weight compression system 102, which can be associated with a cloud computing environment. For example, gradient weight compression system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise gradient weight compression system 102. In some embodiments, gradient weight compression system 102 can comprise a memory 104, a processor 106, compression component 108, a pointer component 110, and/or a bus 112. In some embodiments, gradient weight compression system 102 can be in communication with one or more learners 114*a*, 114*b*, 114N via a network 116, where N can represent a total quantity of learners.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100, gradient weight compression system 102, and/or learners 114*a*, 114*b*, 114N can further comprise various computer and/or computing-based elements described herein with reference to operating environment 1000 and FIG. 10. In several embodiments, such computer and/or computing-based elements can be used in connection with implementing one or more of the systems, devices, components, and/or computer-implemented operations shown and described in connection with FIG. 1 or other figures disclosed herein.

According to multiple embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to gradient weight compression system 102, compression component 108, pointer component 110, learners 114*a*, 114*b*, 114N, and/or another component associated with gradient weight compression system 102 (e.g., transmit component 502), as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, gradient weight compression system 102, memory 104, processor 106, compression component 108, pointer component 110, and/or another component of gradient weight compression system 102 as described herein can be communicatively, electrically, and/or operatively coupled to one another via a bus 112 to perform functions of system 100, gradient weight compression system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

In some embodiments, gradient weight compression system 102 and/or learners 114a, 114b, 114N can comprise any type of component, machine, device, facility, apparatus, and/or instrument that comprises a processor and/or can be capable of effective and/or operative communication with a wired and/or wireless network. All such embodiments are envisioned. For example, gradient weight compression system 102 and/or learners 114a, 114b, 114N can comprise a server device, a computing device, a general-purpose computer, a special-purpose computer, a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, gradient weight compression system 102 can be coupled (e.g., communicatively, electrically, operatively, etc.) to learners 114a, 114b, 114N and/or one or more other external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, gradient weight compression system 102 can be coupled (e.g., communicatively, electrically, operatively, etc.) to learners 114a, 114b, 114N and/or one or more other external systems, sources, and/or devices (e.g., computing devices, communication devices, etc.) via network 116.

According to multiple embodiments, network 116 can comprise wired and wireless networks, including, but not limited to, a cellular network, a wide area network (WAN) (e.g., the Internet) or a local area network (LAN). For example, gradient weight compression system 102 can communicate with learners 114a, 114b, 114N and/or one or more other external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, gradient weight compression system 102 and/or learners 114a, 114b, 114N can thus include hardware (e.g., a central processing unit (CPU), a transceiver, a decoder), software (e.g., a set of threads, a set of processes, software in execution) or a combination of hardware and software that facilitates communicating information between gradient weight compression system 102 and learners 114a, 114b, 114N and/or other external systems, sources, and/or devices (e.g., computing devices, communication devices, etc.).

According to multiple embodiments, gradient weight compression system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with gradient weight compression system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, compression component 108, pointer component 110, and/or any other components associated with gradient weight compression system 102 as disclosed herein (e.g., communicatively, electronically, and/or operatively coupled with and/or employed by gradient weight compression system 102), can comprise such computer and/or machine readable, writable, and/or executable component(s) and/or instruction(s). Consequently, according to numerous embodiments, gradient weight compression system 102 and/or any components associated therewith as disclosed herein, can employ processor 106 to execute such computer and/or machine readable, writable, and/or executable component(s) and/or instruction(s) to facilitate performance of one or more operations described herein with reference to gradient weight compression system 102 and/or any such components associated therewith.

In some embodiments, to implement one or more gradient weight compression operations, gradient weight compression system 102 can facilitate performance of operations executed by and/or associated with compression component 108, pointer component 110, and/or another component associated with gradient weight compression system 102 as disclosed herein (e.g., transmit component 502). For example, as described in detail below, gradient weight compression system 102 can facilitate: identifying one or more compressed gradient weights not present in a first concatenated compressed gradient weight; computing a second concatenated compressed gradient weight based on the one or more compressed gradient weights to update a weight of a learning entity of a machine learning system; identifying the one or more compressed gradient weights based on a first timestamp corresponding to the first concatenated compressed gradient weight and one or more second timestamps corresponding respectively to the one or more compressed gradient weights; computing the first concatenated compressed gradient weight based on one or more second compressed gradient weights of respective learning entities of the machine learning system; transmitting to the respective learning entities of the machine learning system at least one of a size corresponding respectively to the one or more second compressed gradient weights or the first concatenated compressed gradient weight; computing a windowed concatenated compressed gradient weight having only the one or more compressed gradient weights; and/or transmitting to the learning entity at least one of the one or more compressed gradient weights or the second concatenated compressed gradient weight.

According to multiple embodiments, compression component 108 can compute a concatenated compressed gradient weight based on one or more compressed gradient weights of respective learning entities of a machine learning system. For example, compression component 108 can compute a concatenated compressed gradient weight based on one or more compressed gradient weights of respective learners 114a, 114b, 114N of a machine learning system including, but not limited to, a synchronous machine learning system, an asynchronous machine learning system, a synchronous stochastic gradient descent system, an asynchronous stochastic gradient descent system, and/or another machine learning system.

In some embodiments, one or more learners 114a, 114b, 114N can compress their respective gradient weights. For example, one or more learners 114a, 114b, 114N can compress their respective gradient weights using an aggressive compression technique such as, for example, an aggressive compression technique that utilizes ternary gradients. In this example, gradient weight compression system 102 and/or compression component 108 can receive (e.g., via network 116) such compressed gradient weights from learners 114a, 114b, 114N.

In some embodiments, based on one or more compressed gradient weights received from learners 114a, 114b, 114N, compression component 108 can compute a concatenated compressed gradient weight by employing on one or more synchronization protocols and/or mathematical equations associated therewith. For example, compression component 108 can compute a concatenated compressed gradient weight by employing: a hardsync protocol as described below with reference to FIG. 2 (e.g., also referred to as synchronous stochastic gradient descent (SSGD)); a softsync protocol as described below with reference to FIG. 3; and/or an n-softsync protocol as described below with reference to FIG. 4 (e.g., also referred to as asynchronous stochastic gradient descent (ASGD)).

FIG. 2 illustrates an example, non-limiting system 200 that can facilitate gradient weight compression components in accordance with one or more embodiments described herein. Repetitive description of like elements and/or processes employed in various embodiments described herein is omitted for sake of brevity.

In some embodiments, system 200 can comprise a hardsync protocol that can be implemented by gradient weight compression system 102 using equation 202 and/or equation 204. For example, gradient weight compression system 102 can employ such a hardsync protocol to sync learners 114a, 114b, 114N of a distributed machine learning system to ensure all such learners perform computations using an identical set of model parameters (e.g., model parameters of a machine learning system described above).

In some embodiments, equation 202 can comprise the following term definitions: $\nabla$ can denote gradient; W can denote weight; i can denote a gradient weights timestamp; $\lambda$ can denote a total quantity of learners (e.g., learners 114a, 114b, 114N where N can represent a total quantity of learners); and l can denote a learner (e.g., a certain learner of learners 114a, 114b, 114N). In some embodiments, a scalar clock can be used to represent gradient weights timestamp i, which can start from i=0 and each weight update can increment the timestamp by 1. In some embodiments, a of equation 204 can denote a learning rate. In some embodiments, the system 200 hardsync protocol can comprise a single-learner Stochastic Gradient Descent with a batch size of $\lambda$ multiplied by $\mu$ ($\lambda*\mu$), where $\mu$ can denote a mini-batch size that can be used by each learner (e.g., learners 114a, 114b, 114N) to provide stochastic gradient weights.

According to multiple embodiments, by employing the system 200 hardsync protocol, all learners 114a, 114b, 114N can have the same identical model parameters, where such model parameters can be updated by compression component 108 using equation 202. For example, gradient weight compression system 102 and/or compression component 108 can receive (e.g., via network 116) compressed gradient weights from each of the respective learners 114a, 114b, 114N and compression component 108 can update a gradient weight of the model by employing equation 202. For instance, compression component 108 can compute an updated averaged compressed gradient weight of the model and/or an updated concatenated compressed gradient weight of the model using such compressed gradient weights of the respective learners 114a, 114b, 114N as inputs to equation 202.

In some embodiments, gradient weight compression system 102 (e.g., via transmit component 502 described below with reference to FIG. 5) can send (e.g., via network 116) such updated model gradient weight (e.g., updated averaged compressed gradient weight and/or updated concatenated compressed gradient weight), to all learners 114a, 114b, 114N such that each learner has the same identical updated model gradient weight. In some embodiments, each learner 114a, 114b, 114N can update its weights utilizing equation 204. For example, each learner 114a, 114b, 114N can update its weights by inputting into equation 204 the updated model gradient weight computed by compression component 108 (e.g., via equation 202).

In some embodiments, based on implementation of system 200 hardsync protocol, when a certain learner such as, for example, learner 114a, is ready to update its weights (e.g., via equation 204) based on an updated model gradient weight (e.g., an updated averaged compressed gradient weight and/or updated concatenated compressed gradient weight) computed by compression component 108 (e.g., via equation 202), learner 114a must wait for compression component 108 to compute such updated model gradient weight. In these embodiments, compression component 108 cannot compute such updated model gradient weight until it has received compressed gradient weights from learner 114a, as well as all other learners (e.g., learners 114b, 114N, etc.). Therefore, in such embodiments, learner 114a cannot update its weights (e.g., via equation 204) until gradient weight compression system 102 and/or compression component 108 have received compressed gradient weights from all learners 114a, 114b, 114N and compression component 108 has computed the updated model gradient weight (e.g., via equation 202) based on such compressed gradient weights of all learners 114a, 114b, 114N. In these embodiments, to prevent such waiting by any learner 114a, 114b, 114N, gradient weight compression system 102 can employ a softsync protocol as described below with reference to FIG. 3 and/or an n-softsync protocol as described below with reference to FIG. 4.

Figure 3:
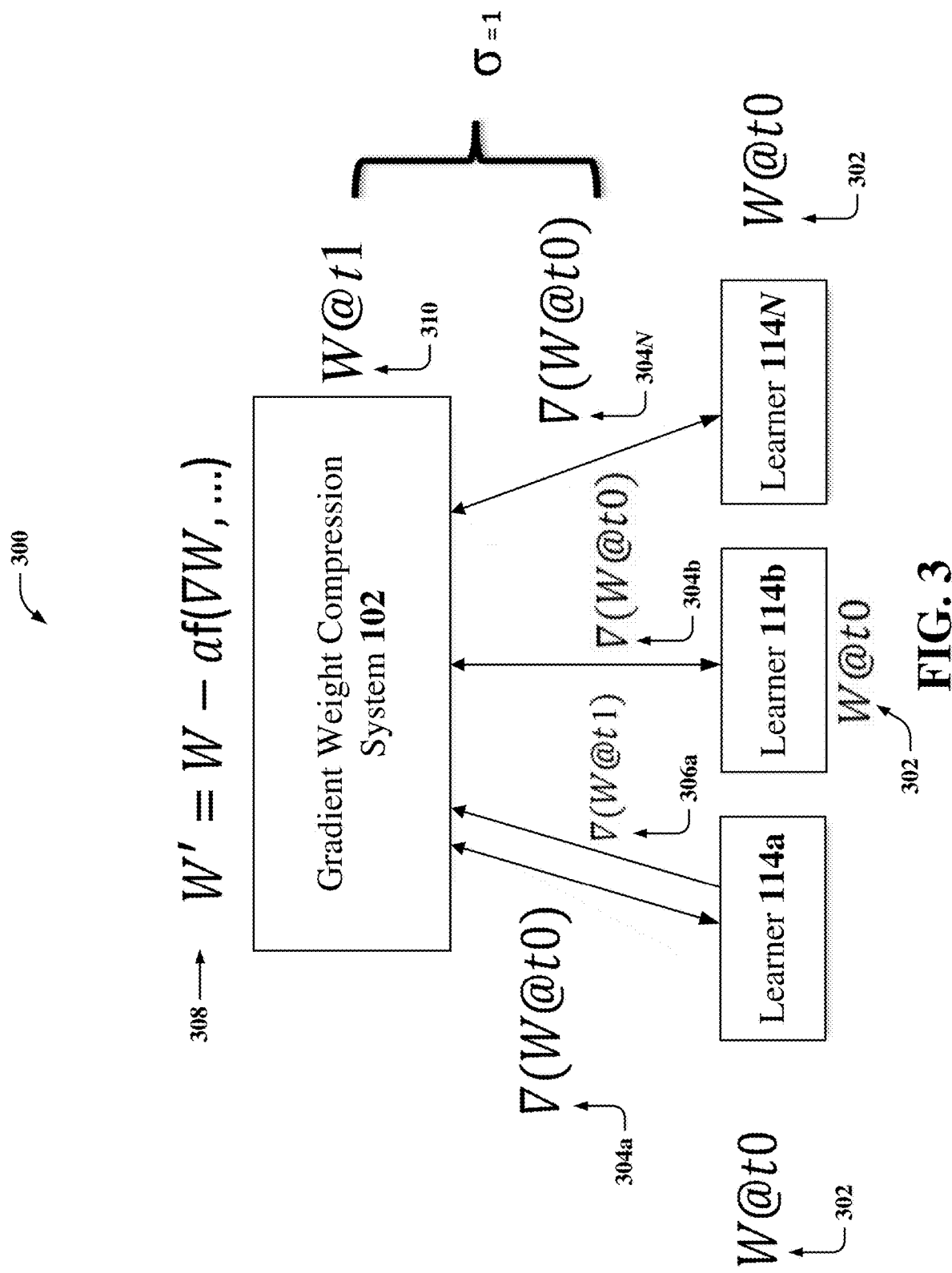
FIG. 3 illustrates an example, non-limiting system that can facilitate gradient weight compression components in accordance with one or more embodiments described herein.

FIG. 3 illustrates an example, non-limiting system 300 that can facilitate gradient weight compression components in accordance with one or more embodiments described herein. Repetitive description of like elements and/or processes employed in various embodiments described herein is omitted for sake of brevity.

In some embodiments, system 300 can comprise a softsync protocol that can be implemented by gradient weight compression system 102. For example, gradient weight compression system 102 can employ the system 300 softsync protocol to sync learners 114a, 114b, 114N based on asynchronous stochastic gradient descent (ASGD).

In some embodiments, at time equals zero (0) in the system 300 softsync protocol (e.g., denoted as @t0 in FIG. 3), compression component 108 can compute (e.g., via equation 202 described above with reference to FIG. 2) a model gradient weight 302 (e.g., an averaged compressed gradient weight and/or concatenated compressed gradient weight) denoted as W@t0 in FIG. 3. In these embodiments, gradient weight compression system 102 can transmit (e.g., via network 116) model gradient weight 302 to learners 114a, 114b, 114N. In these embodiments, learners 114a, 114b, 114N can compute their respective compressed gradient weights 304a, 304b, 304N based on such model gradient weight 302 (e.g., W@t0).

In some embodiments, gradient weight compression system 102 can update model gradient weight 302 based on respective gradient weights received from each learner 114a, 114b, 114N at various times (e.g., @t1, @t2, @t3, etc.). For example, at time equals one (1) in the system 300 syftsync protocol (e.g., denoted as @t1 in FIG. 3), gradient weight compression system 102 and/or compression component 108 can receive (e.g., via network 116) compressed gradient weight 306a from learner 114a. In some embodiments, based on such compressed gradient weight 306a computed by learner 114a at time equals one (1) (e.g., @t1), compression component 108 can compute an update of model gradient weight 302 using equation 308. For example, gradient weight compression system 102 and/or compression component 108 can receive (e.g., via network 116) compressed gradient weight 306a from learner 114a and compression component 108 can compute an updated model gradient weight 310 denoted as W@t1 in FIG. 3 using compressed gradient weight 306a as an input to equation 308.

In some embodiments, equation 308 can comprise the following term definitions: W can denote model gradient weight (e.g., model gradient weight 302); W' can denote an updated model gradient weight (e.g., updated model gradient weight 310); a can denote a learning rate; f can denote a cost function (e.g., a computation cost function); and $\nabla W$ can denote compressed gradient weights of a learner (e.g., compressed gradient weights 304a, 304b, 304N of learners 114a, 114b, 114N and/or compressed gradient weight 306a of learner 114a).

In some embodiments, computation of updated model gradient weight 310 (e.g., W@ t1 as described above) can result in learner 114b and/or learner 114N having a staleness of $\sigma=1$ (e.g., as denoted in FIG. 3) since updated model gradient weight 310 corresponds to t1, not t0 (e.g., as gradient weight compression system 102 has completed one (1) update cycle which learner 114b and/or learner 114N do not have). In some embodiments, such a staleness can compromise accuracy of a machine learning model utilized by gradient weight compression system 102. In these embodiments, to prevent such staleness by any learner 114a, 114b, 114N, gradient weight compression system 102 can implement an n-softsync protocol as described below with reference to FIG. 4.

Figure 4:
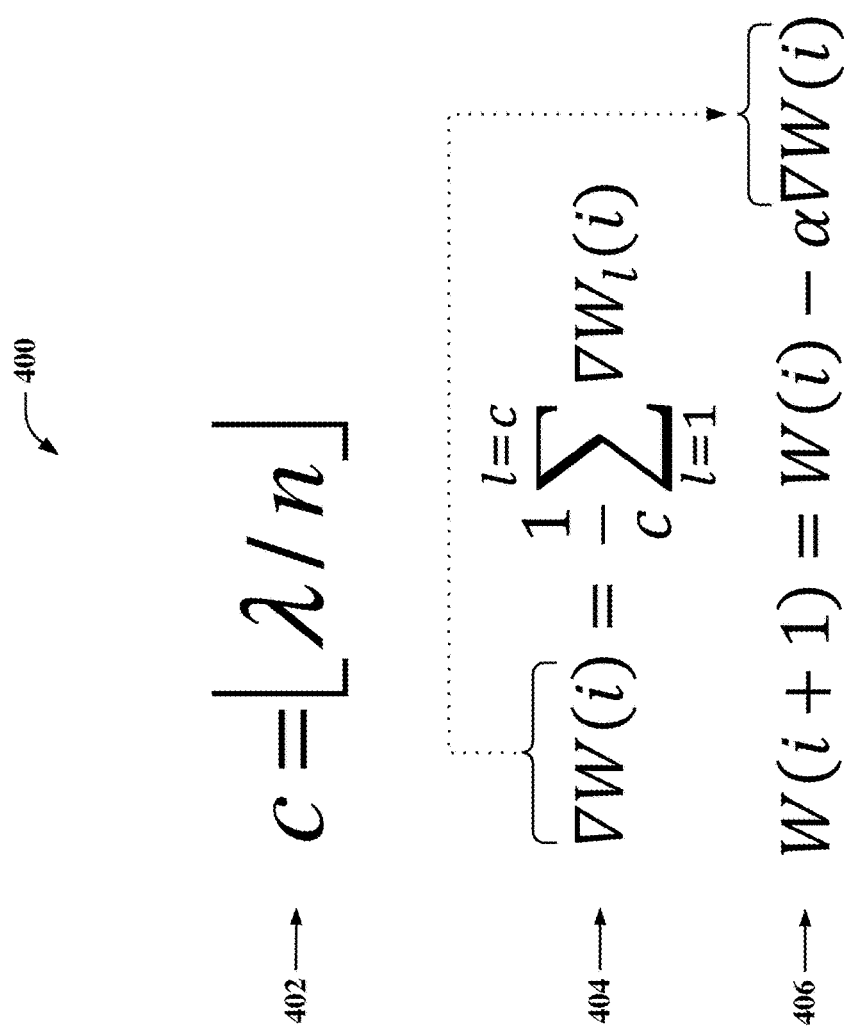
FIG. 4 illustrates an example, non-limiting system that can facilitate gradient weight compression components in accordance with one or more embodiments described herein.

FIG. 4 illustrates an example, non-limiting system 400 that can facilitate gradient weight compression components in accordance with one or more embodiments described herein. Repetitive description of like elements and/or processes employed in various embodiments described herein is omitted for sake of brevity.

According to multiple embodiments, system 400 can comprise an alternative, non-limiting example embodiment of the system 300 softsync protocol, where system 400 can comprise an n-softsync protocol that can be implemented using equation 402, equation 404, and/or equation 406. For example, gradient weight compression system 102 can employ the system 400 n-softsync protocol to asynchronously sync learners 114a, 114b, 114N, where compression component 108 can compute an updated model gradient weight (e.g., an updated averaged compressed gradient weight and/or an updated concatenated compressed gradient weight) based on receiving a defined quantity of compressed gradient weight contributions from any of learners 114a, 114b, 114N. For instance, compression component 108 can compute an updated model gradient weight based on receiving a defined quantity of compressed gradient weight contributions from any of learners 114a, 114b, 114N, where such a defined quantity of compressed gradient weight contributions can be defined using equation 402 as described below.

In some embodiments, instead of waiting to receive compressed gradient weights from all learners 114a, 114b, 114N before compression component 108 can compute an updated model gradient weight (e.g., as with the system 200 hardsync protocol described above) or computing an updated model gradient weight each time gradient weight compression system 102 receives a single compressed gradient weight from any learner 114a, 114b, 114N (e.g., as with the system 300 softsync protocol described above), compression component 108 can compute an updated model gradient weight upon receipt of a defined quantity of compressed gradient weight contributions from any of learners 114a, 114b, 114N. For example, upon receipt of such a defined quantity of compressed gradient weights from any learners 114a, 114b, 114N, compression component 108 can employ equation 404 to compute an updated model gradient weight.

In some embodiments, equation 402 can comprise the following term definitions: λ, can denote a quantity of all learners (e.g., learners 114a, 114b, 114N) of a distributed machine learning system employed by gradient weight compression system 102 that can provide compressed gradient weights to gradient weight compression system 102; n can denote a system staleness (e.g., staleness σ described above with reference to FIG. 3), where n can comprise a value that can range from 1 to λ; c can denote a quantity of compressed gradient weight contributions that gradient weight compression system 102 must receive from any learners λ, (e.g., from any of learners 114a, 114b, 114N) before compression component 108 can compute an updated model gradient weight (e.g., a quantity of compressed gradient weight contributions that gradient weight compression system 102 can wait for before compression component 108 can compute an updated model gradient weight. In some embodiments, equation 404 can comprise an alternative, non-limiting example embodiment of equation 202, where equation 404 can comprise c in place of λ.

In some embodiments, system staleness n can comprise a value of n=1. In such embodiments, the system 400 n-softsync protocol can comprise a 1-softsync protocol, which can be equivalent to the system 200 hardsync protocol described above with reference to FIG. 2. In these embodiments, by implementing such a 1-softsync protocol, gradient weight compression system 102 can wait to receive compressed gradient weights from all learners 114a, 114b, 114N before compression component 108 can compute an updated model gradient weight (e.g., an updated averaged compressed gradient weight and/or an updated concatenated compressed gradient weight).

In some embodiments, system staleness n can comprise a value of n=λ. In such embodiments, the system 400 n-softsync protocol can comprise a λ-softsync protocol, where λ can comprise a value equal to the total quantity of learners 114a, 114b, 114N. In these embodiments, such a λ-softsync protocol can be equivalent to the system 300 softsync protocol described above with reference to FIG. 3. In these embodiments, by implementing such a λ-softsync protocol, compression component 108 can compute an updated model gradient weight (e.g., an updated averaged compressed gradient weight and/or an updated concatenated compressed gradient weight) upon receipt (e.g., by gradient weight compression system 102) of a single compressed gradient weight from any learner 114a, 114b, 114N.

In some embodiments, system staleness n can comprise a value of 1<n<λ. In such embodiments, the system 400 n-softsync protocol can comprise a 1<n<λ-softsync protocol, where n can comprise a value greater than 1 and less than λ. In these embodiments, by implementing such a 1<n<λ-softsync protocol, compression component 108 can compute an updated model gradient weight (e.g., an updated averaged compressed gradient weight and/or an updated concatenated compressed gradient weight) upon receipt (e.g., by gradient weight compression system 102) of a total of c compressed gradient weight contributions from any learner 114a, 114b, 114N, where c is defined by equation 402 illustrated in FIG. 4 and described above.

In some embodiments, the value of system staleness n and/or the quantity of learners λ can be defined by an entity. For example, gradient weight compression system 102 can comprise one or more input devices (e.g., keyboard, mouse, etc.), one or more output devices (e.g., a monitor), and/or a user interface (e.g., a graphical user interface) comprising input controls that can enable an entity (e.g., a human user) to input to gradient weight compression system 102 a value for system staleness n and/or a quantity of learners λ.

In some embodiments, gradient weight compression system 102 (e.g., via transmit component 502 described below with reference to FIG. 5) can send (e.g., via network 116) such an updated model gradient weight (e.g., updated averaged compressed gradient weight and/or updated concatenated compressed gradient weight) to one or more learners 114a, 114b, 114N. In some embodiments, such one or more learners 114a, 114b, 114N that receive such an updated model gradient weight from gradient weight compression system 102 can update their weights utilizing equation 406. For example, such one or more learners 114a, 114b, 114N can update their weights by inputting into equation 406 the updated model gradient weight computed by compression component 108 (e.g., via equation 404). In some embodiments, equation 406 can comprise an alternative, non-limiting example embodiment of equation 204, where equation 406 can comprise equation 404 in place of equation 202.

Returning now to FIG. 1, according to multiple embodiments, pointer component 110 can identify one or more compressed gradient weights not present in a concatenated compressed gradient weight. For example, pointer component 110 can identify one or more compressed gradient weights not present in one or more of the model gradient weights and/or updated model gradient weights described above with reference to FIGS. 2, 3, and 4.

In some embodiments, to facilitate such identification by pointer component 110 of one or more compressed gradient weights not present in a concatenated compressed gradient weight (e.g., a model gradient weight and/or an updated model gradient weight), gradient weight compression system 102 can encode a timestamp (e.g., a digital date and/or time) on each compressed gradient weight received from learners 114a, 114b, 114N to indicate when each compressed gradient weight was received by gradient weight compression system 102. For example, gradient weight compression system 102 can encode such a timestamp in the per-file metadata of each compressed gradient weight file using a timestamping technique including but not limited to, trusted timestamping, timestamp-based concurrency control, a system call (e.g., a stat( ) function), and/or another timestamping technique.

In some embodiments, to further facilitate such identification by pointer component 110 of one or more compressed gradient weights not present in a concatenated compressed gradient weight (e.g., as described above), gradient weight compression system 102 can store each timestamped compressed gradient weight on a memory, where the location of such stored timestamped compressed gradient weight can correspond to a memory address that can be referenced by pointer component 110. For example, gradient weight compression system 102 can store on memory 104 each timestamped compressed gradient weight received from learners 114a, 114b, 114N, where the locations of such stored timestamped compressed gradient weights received from learners 114a, 114b, 114N can correspond to respective memory addresses that can be referenced by pointer component 110.

In some embodiments, based on gradient weight compression system 102 receiving a compressed gradient weight from a certain learner such as, for example, learner 114a, gradient weight compression system 102 can encode a timestamp on such compressed gradient weight (e.g., as described above). In these embodiments, based on the timestamp encoded on such compressed gradient weight received from learner 114a, as well as the timestamps encoded on other compressed gradient weights stored on memory 104 (e.g., as described above), pointer component 110 can identify one or more compressed gradient weights that gradient weight compression system 102 received from other learners (e.g., learners 114b, 114N) since the last time learner 114a provided a compressed gradient weight to gradient weight compression system 102. For example, pointer component 110 can reference one or more memory addresses of memory 104 that identify the location(s) on memory 104 of such one or more compressed gradient weights that have been received by gradient weight compression system 102 since the last time learner 114a provided a compressed gradient weight to gradient weight compression system 102. In this example, such one or more compressed gradient weights that have been received by gradient weight compression system 102 since the last time a certain learner such as, for example, learner 114a, provided a compressed gradient weight to gradient weight compression system 102 can constitute one or more compressed gradient weights not present in a concatenated compressed gradient weight (e.g., not present in one or more of the model gradient weights and/or updated model gradient weights described above with reference to FIGS. 2, 3, and 4).

Additionally or alternatively, in some embodiments, pointer component 110 can identify one or more compressed gradient weights not present in a concatenated compressed gradient weight based on a timestamp corresponding to such concatenated compressed gradient weight and one or more other timestamps corresponding respectively to the one or more compressed gradient weights. For example, based on compression component 108 computing a concatenated compressed gradient weight (e.g., a model gradient weight and/or updated model gradient weight described above with reference to FIGS. 2, 3, and 4), gradient weight compression system 102 can encode (e.g., as described above) a timestamp on such concatenated compressed gradient weight and store such timestamped concatenated compressed gradient weight on memory 104 with a memory address corresponding thereto. In this example, based on the timestamp encoded on such concatenated compressed gradient weight, as well as timestamps encoded on compressed gradient weights stored on memory 104, pointer component 110 can reference one or more of such compressed gradient weights stored on memory 104 that are encoded with timestamps that postdate the timestamp encoded on such concatenated compressed gradient weight. In this example, such compressed gradient weights that are encoded with timestamps that postdate the timestamp encoded on such concatenated compressed gradient weight can constitute compressed gradient weights received by gradient weight compression system 102 after compression component 108 computes such concatenated compressed gradient weight. For instance, such postdated compressed gradient weights can constitute compressed gradient weights received by gradient weight compression system 102 after compression component 108 computes such concatenated compressed gradient weight and before gradient weight compression system 102 has received enough compressed gradient weight contributions c to compute an updated concatenated compressed gradient weight (e.g., as described above).

In some embodiments, compression component 108 can compute a second concatenated compressed gradient weight based on one or more compressed gradient weights not present in a first concatenated compressed gradient weight to update a weight of a learning entity of a machine learning system. For example, compression component 108 can compute an updated model gradient weight (e.g., via equations 202, 308, and/or 404 as described above with reference to FIGS. 2, 3, and 4, respectively) using one or more compressed gradient weights that can be identified by pointer component 110 as being not present in a previously computed model gradient weight (e.g., as described above with reference to pointer component 110). In this example, one or more learners 114a, 114b, 114N can use such an updated model gradient weight computed by compression component 108 (e.g., a second concatenated compressed gradient weight) to update their respective weights (e.g., via equation 204 and/or equation 406 described above with reference to FIGS. 2 and 4, respectively).

In some embodiments, compression component 108 can compute such an updated model gradient weight (e.g., via equations 202, 308, and/or 404 as described above with reference to FIGS. 2, 3, and 4, respectively) using all compressed gradient weights stored on memory 104, including such one or more compressed gradient weights that can be identified by pointer component 110 as being not present in a previously computed model gradient weight (e.g., as described above with reference to pointer component 110). In some embodiments, compression component 108 can compute an updated model gradient weight (e.g., via equations 202, 308, and/or 404 as described above with reference to FIGS. 2, 3, and 4, respectively) that can constitute a windowed concatenated compressed gradient weight. In these embodiments, compression component 108 can compute such windowed concatenated compressed gradient weight using only the one or more compressed gradient weights that can be identified by pointer component 110 as being not present in a previously computed model gradient weight (e.g., as described above with reference to pointer component 110). In the embodiments described here, one or more learners 114a, 114b, 114N can use one or more of such updated model gradient weights computed by compression component 108 (e.g., a second concatenated compressed gradient weight and/or a windowed concatenated compressed gradient weight) to update their respective weights (e.g., via equation 204 and/or equation 406 described above with reference to FIGS. 2 and 4, respectively).

Figure 5:
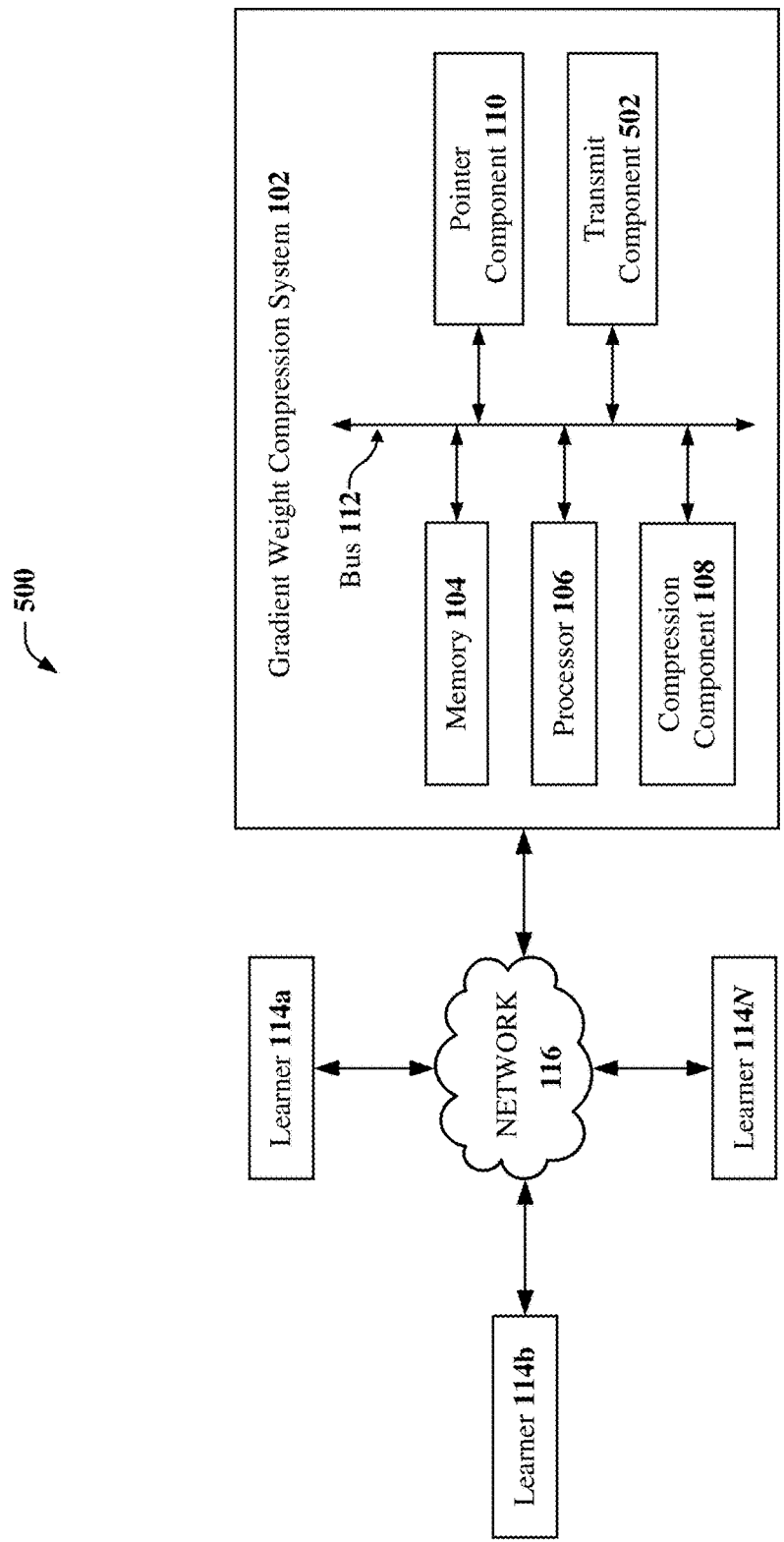
FIG. 5 illustrates a block diagram of an example, non-limiting system that can facilitate gradient weight compression components in accordance with one or more embodiments described herein.

FIG. 5 illustrates a block diagram of an example, non-limiting system 500 that can facilitate gradient weight compression components in accordance with one or more embodiments described herein. In some embodiments, system 200 can comprise gradient weight compression system 102. In some embodiments, gradient weight compression system 102 can comprise a transmit component 502. Repetitive description of like elements and/or processes employed in various embodiments described herein is omitted for sake of brevity.

According to multiple embodiments, transmit component 502 can comprise a transmitter component that can facilitate communication of data (e.g., via network 116) by gradient weight compression system 102 with one or more external entities. For example, transmit component 502 can comprise a transmitter component including, but not limited to, a transmitter device, a transceiver device, and/or another transmitter component that can facilitate data communication between gradient weight compression system 102 and one or more learners 114a, 114b, 114N.

In some embodiments, transmit component 502 can transmit one or more compressed gradient weights to one or more learners 114a, 114b, 114N. For example, transmit component 502 can transmit to one or more learners 114a, 114b, 114N the one or more compressed gradient weights that can be identified by pointer component 110 as not being present in a previously computed model gradient weight (e.g., as described above with reference to pointer component 110 and FIG. 1). In another example, transmit component 502 can transmit to a certain learner such as, for example, learner 114a, the one or more compressed gradient weights that can be identified by pointer component 110 as being received by gradient weight compression system 102 from other learners (e.g., learners 114b, 114N, etc.) since the last time learner 114a provided a compressed gradient weight to gradient weight compression system 102 (e.g., as described above with reference to pointer component 110 and FIG. 1). In these examples, one or more learners 114a, 114b, 114N can use such one or more compressed gradient weights identified by pointer component 110 (e.g., as described above) to update their respective weights (e.g., via equation 204 and/or equation 406 described above with reference to FIGS. 2 and 4, respectively).

In some embodiments, transmit component 502 can transmit to one or more learners 114a, 114b, 114N a size corresponding respectively to one or more compressed gradient weights. For example, based on gradient weight compression system 102 receiving one or more compressed gradient weights from one or more learners 114a, 114b, 114N, transmit component 502 can transmit to one or more learners 114a, 114b, 114N (e.g., to all learners 114a, 114b, 114N) a size (e.g., file size) corresponding to each of such one or more compressed gradient weights.

In some embodiments, transmit component 502 can transmit a first concatenated compressed gradient weight to one or more learners 114a, 114b, 114N. For example, based on compression component 108 computing a first concatenated compressed gradient weight (e.g., a model gradient weight) using compressed gradient weights received from one or more learners 114a, 114b, 114N, transmit component 502 can transmit such a first concatenated compressed gradient weight to one or more learners 114a, 114b, 114N (e.g., to all learners 114a, 114b, 114N).

In some embodiments, transmit component 502 can transmit a second concatenated compressed gradient weight to one or more learners 114a, 114b, 114N. For example, transmit component 502 can transmit to one or more learners 114a, 114b, 114N an updated model gradient weight computed by compression component 108 (e.g., as described above). For instance, transmit component 502 can transmit to one or more learners 114a, 114b, 114N an updated model gradient weight including, but not limited to, an updated model gradient weight computed by compression component 108 using all compressed gradient weights stored on memory 104, an updated model gradient weight computed by compression component 108 using only compressed gradient weights that can be identified by pointer component 110 as not being present in a previously computed model gradient weight (e.g., a windowed concatenated compressed gradient weight described above with reference to FIG. 1), and/or another updated model gradient weight.

Figure 6:
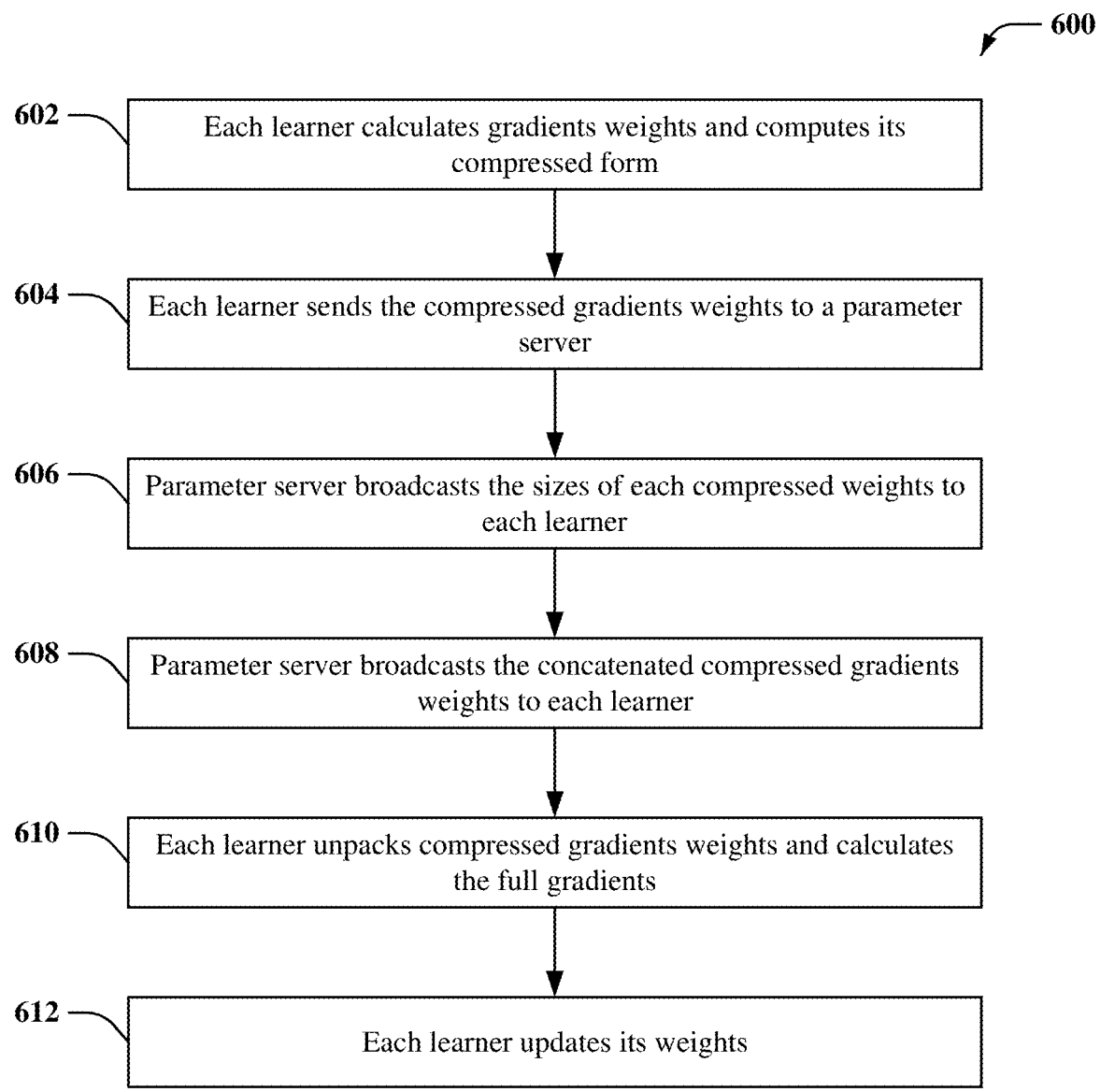
FIG. 6 illustrates a flow diagram of an example, non-limiting computer-implemented method that can facilitate gradient weight compression components in accordance with one or more embodiments described herein.

FIG. 6 illustrates a flow diagram of an example, non-limiting computer-implemented method 600 that can facilitate gradient weight compression components in accordance with one or more embodiments described herein. Repetitive description of like elements and/or processes employed in various embodiments described herein is omitted for sake of brevity.

At 602, in some embodiments, each learner 114a, 114b, 114N can compute its gradient weights and a compressed form of such gradient weights. For example, each learner 114a, 114b, 114N can compute (e.g., via an aggressive compression technique that utilizes ternary gradients) a compressed form of its gradient weights that can be represented as a vector, where the length of such a vector can be different for each learner 114a, 114b, 114N. For instance, learner 114a can comprise a vector length of 10, learner 114b can comprise a vector length of 11, and/or learner 114N can comprise a vector length of 100.

At 604, in some embodiments, each learner 114a, 114b, 114N can send (e.g., via network 116) their compressed gradient weights to a parameter server such as, for example, gradient weight compression system 102. For example, each learner 114a, 114b, 114N can send their compressed gradient weights to gradient weight compression system 102 via network 116.

At 606, in some embodiments, gradient weight compression system 102 can comprise a complete compressed gradient weight array comprising one or more compressed gradient weights provided by one or more learners 114a, 114b, 114N (e.g., the concatenated compressed gradient weight as described above with reference to equations 202, 308, and 404 depicted in FIGS. 2, 3, and 4, respectively). In such embodiments, gradient weight compression system 102 can also comprise the respective sizes of each compressed gradient weight provided by each learner 114a, 114b, 114N. In some embodiments, gradient weight compression system 102 can send these sizes to each learner 114a, 114b, 114N (e.g., via transmit component 502 and/or network 116). In such embodiments, gradient weight compression system 102 can send these sizes to all learners 114a, 114b, 114N to inform all such learners 114a, 114b, 114N of the size of each compressed gradient weight computed by each learner 114a, 114b, 114N so that each learner 114a, 114b, 114N can create a buffer in anticipation of the next update iteration, as the size of the compressed gradient weights sent by each learner 114a, 114b, 114N for each update iteration can be different.

At 608, in some embodiments, gradient weight compression system 102 can send (e.g., via transmit component 502 and/or network 116) each learner 114a, 114b, 114N a copy of a concatenated compressed gradient weight computed by compression component 108, which can be in the form of a concatenated vector. In these embodiments, such a concatenated vector can concatenate the compressed gradient weights provided to gradient weight compression system 102 by each learner 114a, 114b, 114N.

At 610, in some embodiments, each learner 114a, 114b, 114N can unpack compressed gradient weights of the concatenated compressed gradient weight (e.g., concatenated vector) computed by compression component 108 and provided to learners 114a, 114b, 114N by gradient weight compression system 102. In such embodiments, each learner 114a, 114b, 114N can further compute the full gradients by employing, for example, equations 204 and/or 406 described above with reference to FIGS. 2 and 4, respectively.

At 612, in some embodiments, each learner 114a, 114b, 114N can update its weights. For example, each learner 114a, 114b, 114N can update its weights based on the full gradients computed by each learner 114a, 114b, 114N at operation 610 above.

Figure 7:
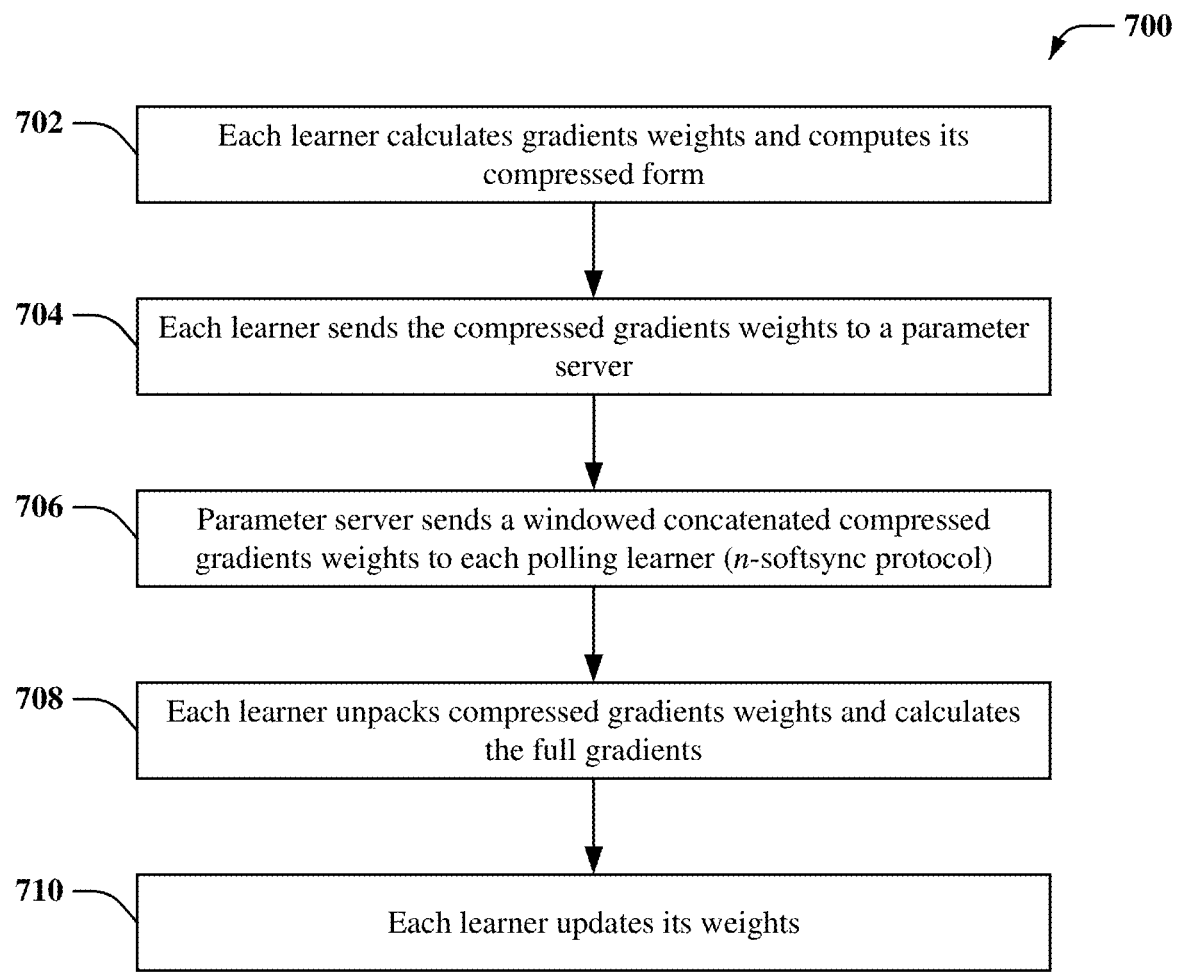
FIG. 7 illustrates a flow diagram of an example, non-limiting computer-implemented method that can facilitate gradient weight compression components in accordance with one or more embodiments described herein.

FIG. 7 illustrates a flow diagram of an example, non-limiting computer-implemented method 700 that can facilitate gradient weight compression components in accordance with one or more embodiments described herein. Repetitive description of like elements and/or processes employed in various embodiments described herein is omitted for sake of brevity.

At 702, in some embodiments, each learner 114a, 114b, 114N can compute its gradient weights and a compressed form of such gradient weights. For example, each learner 114a, 114b, 114N can compute (e.g., via an aggressive compression technique that utilizes ternary gradients) a compressed form of its gradient weights that can be represented as a vector, where the length of such a vector can be different for each learner 114a, 114b, 114N. For instance, learner 114a can comprise a vector length of 10, learner 114b can comprise a vector length of 11, and/or learner 114N can comprise a vector length of 100.

At 704, in some embodiments, each learner 114a, 114b, 114N can send (e.g., via network 116) their compressed gradient weights to a parameter server such as, for example, gradient weight compression system 102. For example, each learner 114a, 114b, 114N can send their compressed gradient weights to gradient weight compression system 102 via network 116.

At 706, in some embodiments, gradient weight compression system 102 can send (e.g., via transmit component 502 and/or network 116) a windowed concatenated compressed gradient weight to each polling learner 114a, 114b, 114N. For example, as described above, in some embodiments, compression component 108 can compute an updated model gradient weight (e.g., via equations 202, 308, and/or 404 as described above with reference to FIGS. 2, 3, and 4, respectively) that can constitute a windowed concatenated compressed gradient weight. For instance, compression component 108 can compute such a windowed concatenated compressed gradient weight using only the one or more compressed gradient weights that can be identified by pointer component 110 as being not present in a previously computed model gradient weight (e.g., as described above with reference to pointer component 110). In these examples, compression component 108 can compute such a windowed concatenated compressed gradient weight when gradient weight compression system 102 implements an n-softsync protocol (e.g., the system 400 n-softsync protocol described above with reference to FIG. 4).

In some embodiments, instead of gradient weight compression system 102 collecting all compressed gradient weights from all learners 114a, 114b, 114N, gradient weight compression system 102 could comprise a buffer that can store all incoming compressed gradient weights from all learners 114a, 114b, 114N. In some embodiments, gradient weight compression system 102 can further record (e.g., via an index and/or a log) how many compressed gradient weights it has stored (e.g., on memory 104) and/or assign an order to each compressed gradient weight (e.g., via an electronic timestamping technique as described above). In some embodiments, when a learner 114a, 114b, 114N tries to poll a compressed gradient weight from gradient weight compression system 102 (e.g., a model gradient weight computed by compression component 108), such learner 114a, 114b, 114N can provide a timestamp indicating the last time it polled the compressed gradient weight from gradient weight compression system 102. In some embodiments, based on such a timestamp, gradient weight compression system 102 (e.g., via pointer component 110 as described above) can determine which compressed gradient weights such learner 114a, 114b, 114N requires (e.g., which compressed gradient weights have been received and included in the concatenated compressed gradient weight computed by compression component 108 since the last time such learner 114a, 114b, 114N polled gradient weight compression system 102). In some embodiments, such learner 114a, 114b, 114N can receive a list of compressed gradient weights that can be different from a list that another learner 114a, 114b, 114N can receive, as learners 114a, 114b, 114N can operate (e.g., complete tasks) at different speeds, and thus, such learners 114a, 114b, 114N can have different update rates, which can constitute the asynchronous communication aspect of the subject disclosure.

In some embodiments, gradient weight compression system 102 can comprise pointer component 110 (e.g., as described above with reference to pointer component 110 and FIG. 1) that can pull different sites of a concatenated compressed gradient weight (e.g., a concatenated compressed vector). For example, pointer component 110 can determine which compressed gradient weights of a concatenated compressed gradient weight (e.g., a concatenated compressed vector) are required to update weight of a learner 114a, 114b, 114N, where pulling such compressed gradient weights can constitute computing a windowed concatenated compressed gradient weight.

In some embodiments, gradient weight compression system 102 can send (e.g., via transmit component 502 and/or network 116) each learner 114a, 114b, 114N a unique windowed concatenated compressed gradient weight. In some embodiments, such a unique windowed concatenated compressed gradient weight sent by gradient weight compression system 102 to a certain learner such as, for example, learner 114a can be different from the windowed concatenated compressed gradient weight that all other learners such as, for example learners 114b, 114N, can receive from gradient weight compression system 102. For instance, such a unique windowed concatenated compressed gradient weight can be different since it will include all compressed gradient weights processed by gradient weight compression system 102 since the last timestamp such learner 114a polled gradient weight compression system 102, during which time other learners 114b, 114N can complete new computations and provide to gradient weight compression system 102 new compressed gradient weights. In this example, such new compressed gradient weights are what learner 114a can receive from gradient weight compression system 102 (e.g., a unique windowed concatenated compressed gradient weight). In the examples described here, such an asynchronous protocol (e.g., an asynchronous stochastic gradient descent (ASGD) protocol) can be different from a synchronous protocol (e.g., a synchronous stochastic gradient descent (SSGD) protocol) where gradient weight compression system 102 can send all learners 114a, 114b, 114N the exact same concatenated compressed gradient weight.

At 708, in some embodiments, each learner 114a, 114b, 114N can unpack compressed gradient weights of the windowed concatenated compressed gradient weight (e.g., windowed concatenated vector) computed by compression component 108 and provided to learners 114a, 114b, 114N by gradient weight compression system 102 (e.g., as described above). In such embodiments, each learner 114a, 114b, 114N can further compute the full gradients by employing, for example, equations 204 and/or 406 described above with reference to FIGS. 2 and 4, respectively.

At 710, in some embodiments, each learner 114a, 114b, 114N can update its weights. For example, each learner 114a, 114b, 114N can update its weights based on the full gradients computed by each learner 114a, 114b, 114N at operation 708 above.

In some embodiments, gradient weight compression system 102 can be a gradient weight compression system and/or process associated with various technologies. For example, gradient weight compression system 102 can be associated with ASGD technologies, SSGD technologies, machine learning technologies, distributed machine learning technologies, data analytics technologies, decision-making technologies, artificial intelligence technologies, and/or other technologies.

In some embodiments, gradient weight compression system 102 can provide technical improvements to systems, devices, components, operational steps, and/or processing steps associated with the various technologies identified above. For example, gradient weight compression system 102 can: identify one or more compressed gradient weights not present in a first concatenated compressed gradient weight; compute a second concatenated compressed gradient weight based on the one or more compressed gradient weights to update a weight of a learning entity of a machine learning system; compute the first concatenated compressed gradient weight based on one or more second compressed gradient weights of respective learning entities of the machine learning system; and/or compute, a windowed concatenated compressed gradient weight having only the one or more compressed gradient weights. In this example, such identification and/or computation operations can constitute aggressive backward compression (e.g., from a parameter server to leaner entities), which can be implemented in a distributed machine learning model (e.g., an ASGD system) to enable computationally inexpensive calculation of concatenated compressed gradient weights of such a distributed machine learning model (e.g., an ASGD), where such concatenated compressed gradient weights can be transferred via reduced computational costs (e.g., reduced by a factor of 32) between a parameter server (e.g., gradient weight compression system 102) and one or more remote learner entities of the distributed machine learning system (e.g., learners 114a, 114b, 1141V) without compromising accuracy of model parameters of such a system.

It should be appreciated that gradient weight compression system 102 can resolve a communication bottleneck from a parameter server (e.g., gradient weight compression system 102) to learner entities (e.g., learners 114a, 114b, 114N) of an asynchronous system (e.g., an ASGD). For example, gradient weight compression system 102 can resolve such a communication bottleneck by sending compressed gradient weights instead of compressed weights to such learner entities, as compressed weights can compromise model accuracy, whereas compressed gradient weights do not compromise model accuracy.

In some embodiments, gradient weight compression system 102 can provide technical improvements to a processing unit associated with a gradient weight compression system (e.g., an ASGD system). For example, gradient weight compression system 102 can facilitate aggressive backward compression of a model gradient weight in an ASGD system, which can enable a reduction of the weights communication cost (e.g., by a factor of 32). In this example, such a reduction of the weights communication cost can reduce the workload of a processor associated with such an ASGD system (e.g., processor 106), thereby improving processing efficiency, processing capacity, and/or processing time of such processor and/or reducing processing power consumption by such processor.

In some embodiments, gradient weight compression system 102 can employ hardware and/or software to solve problems that are highly technical in nature, that are not abstract and that cannot be performed as a set of mental acts by a human. For example, gradient weight compression system 102 can automatically: identify one or more compressed gradient weights not present in a first concatenated compressed gradient weight; compute a second concatenated compressed gradient weight based on the one or more compressed gradient weights to update a weight of a learning entity of a machine learning system; compute the first concatenated compressed gradient weight based on one or more second compressed gradient weights of respective learning entities of the machine learning system; and/or compute, a windowed concatenated compressed gradient weight having only the one or more compressed gradient weights. In this example, to facilitate such identification and/or computation operations, gradient weight compression system 102 can employ various mathematical functions and/or algorithms (e.g., as described above with reference to FIGS. 1, 2, 3, and 4) comprising a multitude of variables, where such mathematical functions and/or algorithms can be implemented in a d-dimensional vector space to facilitate execution of the various operations of gradient weight compression system 102 as described herein.

It is to be appreciated that gradient weight compression system 102 can perform a gradient weight compression process utilizing various combinations of electrical components, mechanical components, and circuitry that cannot be replicated in the mind of a human or performed by a human. For example, the identification and computing operations described above, are operations that are greater than the capability of a human mind. For instance, the amount of data processed, the speed of processing such data, and/or the types of data processed by gradient weight compression system 102, compression component 108, and/or pointer component 110 over a certain period of time can be greater, faster, and/or different than the amount, speed, and/or data type that can be processed by a human mind over the same period of time.

According to several embodiments, gradient weight compression system 102 can also be fully operational towards performing one or more other functions (e.g., fully powered on, fully executed, etc.) while also performing the above-referenced gradient weight compression process. It should be appreciated that such simultaneous multi-operational execution is beyond the capability of a human mind. It should also be appreciated that gradient weight compression system 102 can include information that is impossible to obtain manually by an entity, such as a human user. For example, the type, amount, and/or variety of information included in compression component 108, pointer component 110, and/or transmit component 502 can be more complex than information obtained manually by a human user.

FIG. 8 illustrates a flow diagram of an example, non-limiting computer-implemented method 800 that can facilitate gradient weight compression components in accordance with one or more embodiments described herein. Repetitive description of like elements and/or processes employed in various embodiments described herein is omitted for sake of brevity.

At 802, identifying, by a system (e.g., via gradient weight compression system 102 and/or pointer component 110) operatively coupled to a processor (e.g., processor 106), one or more compressed gradient weights (e.g., compressed gradient weights provided by one or more learners 114a, 114b, 114N) not present in a first concatenated compressed gradient weight (e.g., a model gradient weight computed by compression component 108).

At 804, computing, by the system (e.g., via gradient weight compression system 102 and/or compression component 108), a second concatenated compressed gradient weight (e.g., an updated model gradient weight, a windowed concatenated compressed gradient weight, etc.) based on the one or more compressed gradient weights to update a weight of a learning entity (e.g., learner 114a, 114b, 114N) of a machine learning system (e.g., an ASGD system).

Figure 9:
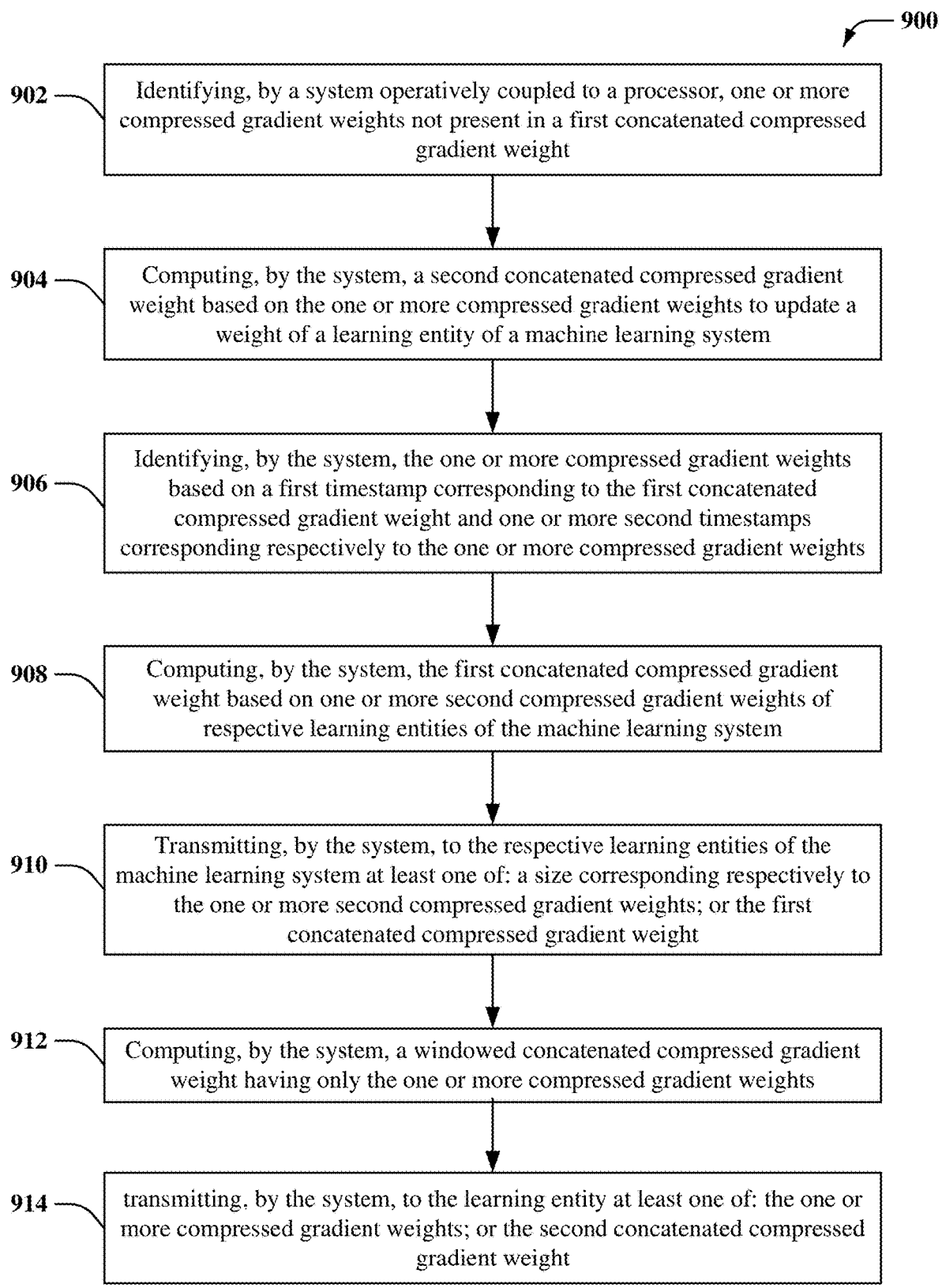
FIG. 9 illustrates a flow diagram of an example, non-limiting computer-implemented method that can facilitate gradient weight compression components in accordance with one or more embodiments described herein.

FIG. 9 illustrates a flow diagram of an example, non-limiting computer-implemented method 900 that can facilitate gradient weight compression components in accordance with one or more embodiments described herein. Repetitive description of like elements and/or processes employed in various embodiments described herein is omitted for sake of brevity.

At 902, identifying, by a system (e.g., via gradient weight compression system 102 and/or pointer component 110) operatively coupled to a processor (e.g., processor 106), one or more compressed gradient weights (e.g., compressed gradient weights provided by one or more learners 114a, 114b, 114N) not present in a first concatenated compressed gradient weight (e.g., a model gradient weight computed by compression component 108).

At 904, computing, by the system (e.g., via gradient weight compression system 102 and/or compression component 108), a second concatenated compressed gradient weight (e.g., an updated model gradient weight, a windowed concatenated compressed gradient weight, etc.) based on the one or more compressed gradient weights to update a weight of a learning entity (e.g., learner 114a, 114b, 114N) of a machine learning system (e.g., an ASGD system).

At 906, identifying, by the system (e.g., via gradient weight compression system 102 and/or pointer component 110), the one or more compressed gradient weights based on a first timestamp corresponding to the first concatenated compressed gradient weight and one or more second timestamps corresponding respectively to the one or more compressed gradient weights (e.g., as described above with reference to FIG. 1).

At 908, computing, by the system (e.g., via gradient weight compression system 102 and/or compression component 108), the first concatenated compressed gradient weight based on one or more second compressed gradient weights of respective learning entities (e.g., learners 114a, 114b, 114N) of the machine learning system.

At 910, transmitting, by the system (e.g., via gradient weight compression system 102, transmit component 502, and/or network 116), to the respective learning entities of the machine learning system at least one of: a size corresponding respectively to the one or more second compressed gradient weights; or the first concatenated compressed gradient weight.

At 912, computing, by the system (e.g., via gradient weight compression system 102 and/or compression component 108), a windowed concatenated compressed gradient weight having only the one or more compressed gradient weights (e.g., as described above with reference to FIG. 1).

At 914, transmitting, by the system (e.g., via gradient weight compression system 102, transmit component 502, and/or network 116), to the learning entity at least one of: the one or more compressed gradient weights; or the second concatenated compressed gradient weight.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
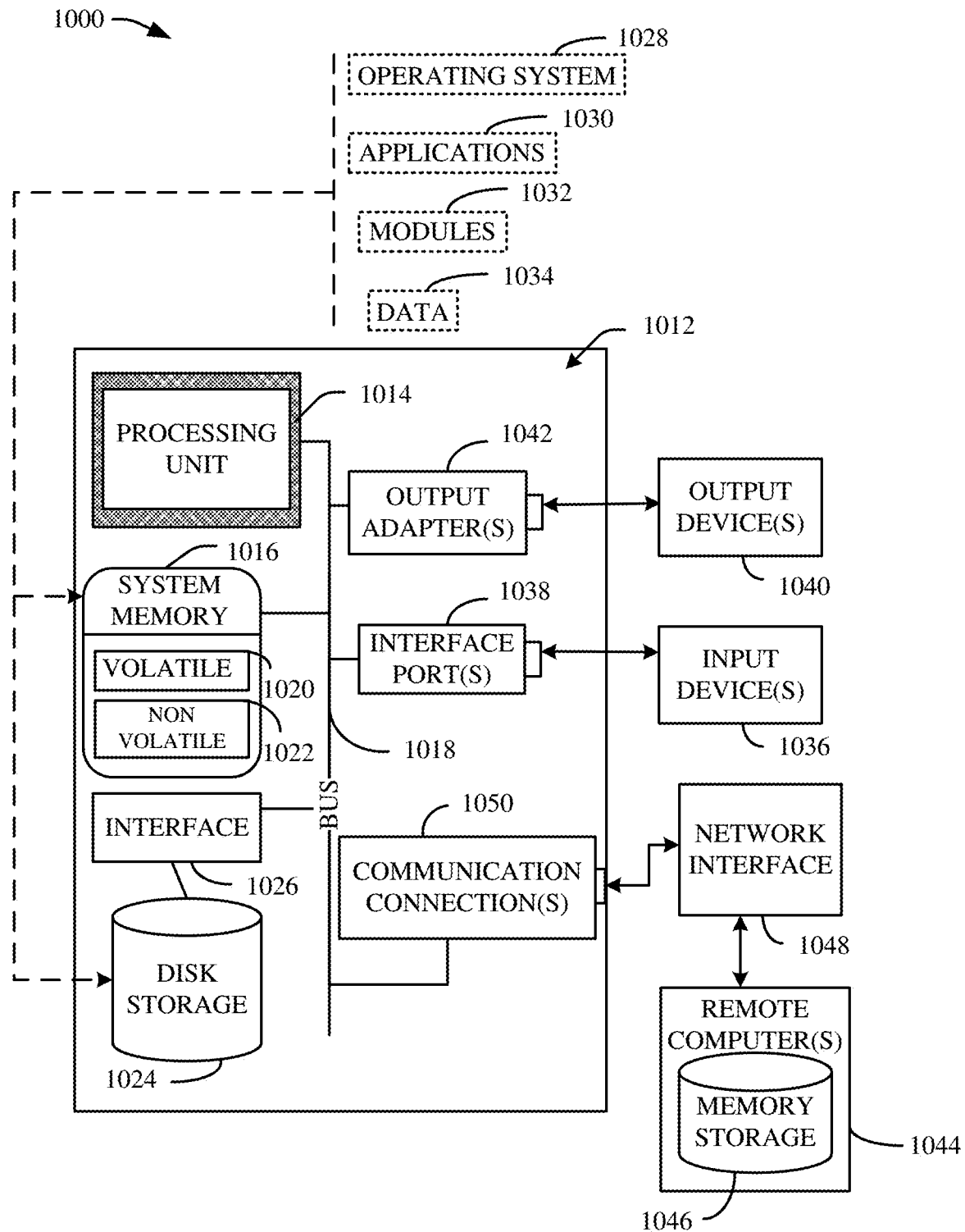
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
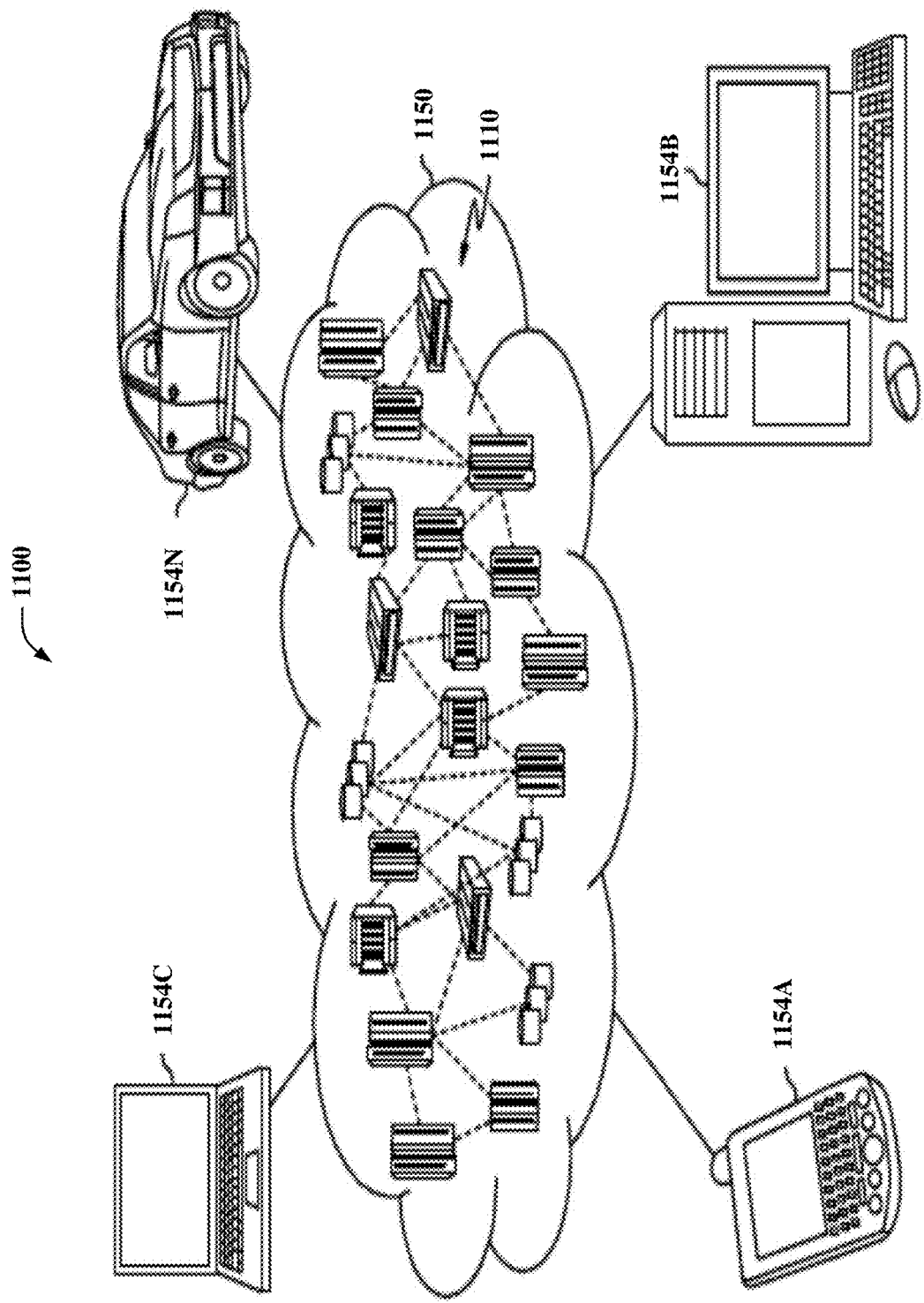
FIG. 11 illustrates a block diagram of an example, non-limiting cloud computing environment in accordance with one or more embodiments of the subject disclosure.

Referring now to FIG. 11, an illustrative environment 1100 comprising a cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
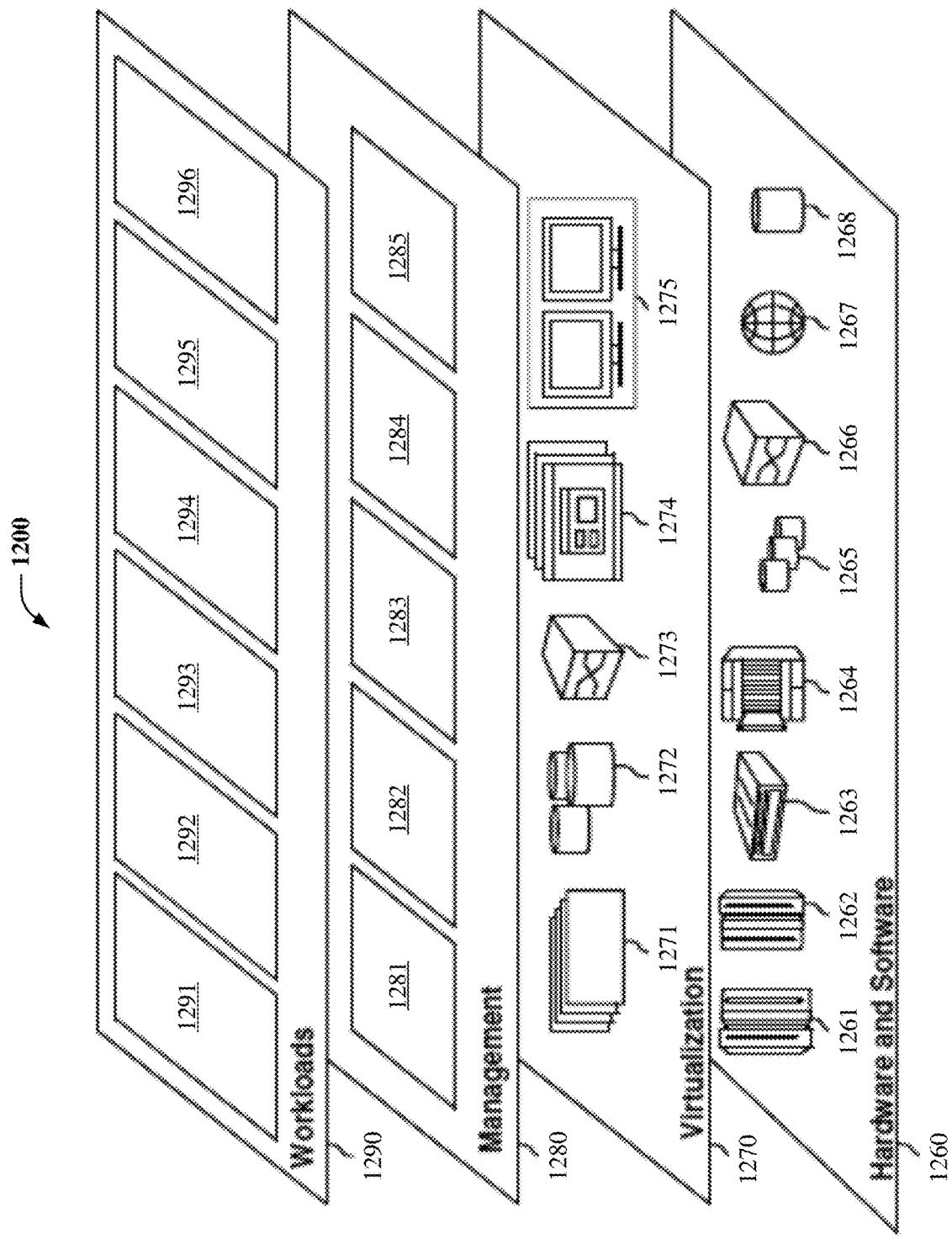
FIG. 12 illustrates a block diagram of example, non-limiting abstraction model layers in accordance with one or more embodiments of the subject disclosure.

Referring now to FIG. 12, a set of functional abstraction layers 1200 provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and gradient weight compression software 1296.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a pointer component that identifies compressed gradient weights, from a first group of second learning entities of a distributed machine learning system, not present in a first concatenated compressed gradient weight vector that was previously sent to a first learning entity of the distributed machine learning system, wherein the first concatenated compressed gradient weight vector is based on other compressed gradient weights from a second group of second learning entities of the distributed machine learning system, and wherein the first group of second learning entities is less than an entirety of second learning entities of the distributed machine learning system and is different from the second group of second learning entities;
      a compression component that generates a second concatenated compressed gradient weight vector for the first learning entity, based on the compressed gradient weights and not any of the other compressed gradient weights employed to generate the first concatenated compressed gradient weight vector, to update a weight of the first learning entity, wherein the second concatenated compressed gradient weight vector comprises a concatenation of the compressed gradient weights; and
      a transmit component that transmits, via a network, to the first learning entity:
         a first transmission comprising information identifying respective vector lengths of the compressed gradient weights in the second concatenated compressed gradient weight vector, wherein the second concatenated compressed gradient weight vector comprises a plurality of compressed gradient weights, at least two of the respective vector lengths are different, and the first learning entity employs the respective vector lengths to identify the compressed gradient weights in the second concatenated compressed gradient weight vector, and
         a second transmission comprising the second concatenated compressed gradient weight vector to initiate the first learning entity to update the weight of the first learning entity using the second concatenated compressed gradient weight vector.

2. The system of claim 1, wherein the pointer component identifies the compressed gradient weights based on a first timestamp corresponding to the first concatenated compressed gradient weight vector and respective second timestamps corresponding respectively to the compressed gradient weights.

3. The system of claim 1, wherein the pointer component receives, from the first learning entity, an updated compressed gradient weight based on the updated weight.

4. The system of claim 1, wherein the compression component encodes a timestamp on the second concatenated compressed gradient weight vector.

5. The system of claim 1, wherein the second concatenated compressed gradient weight vector comprises a windowed concatenated compressed gradient weight having only the compressed gradient weights, thereby facilitating at least one of: improved processing efficiency associated with the processor; or reduced storage consumption associated with the memory.

6. The system of claim 1, wherein the distributed machine learning system comprises at least one of an asynchronous machine learning system or an asynchronous stochastic gradient descent system.

7. A computer-implemented method, comprising:
   receiving, by a first machine learning device of a distributed machine learning system, from a parameter server, a first transmission comprising a second concatenated compressed gradient weight vector, wherein the second concatenated compressed gradient weight vector was generated based on compressed gradient weights from a first group of second machine learning devices of the distributed machine learning system, not present in a first concatenated compressed gradient weight vector received by the first machine learning device, and generated not using any compressed gradient weights employed to generate the first concatenated compressed gradient weight vector, wherein the second concatenated compressed gradient weight vector comprises a concatenation of the compressed gradient weights, wherein the first concatenated compressed gradient weight vector is based on other compressed gradient weights from a second group of the second machine learning devices of the distributed machine learning system, and wherein the first group is less than an entirety of the second machine learning devices of the distributed machine learning system and is different from the second group;
   receiving, by the first machine learning device, from the parameter server, a second transmission comprising information identifying respective vector lengths of the compressed gradient weights in the second concatenated compressed gradient weight vector, wherein the second concatenated compressed gradient weight vector comprises a plurality of compressed gradient weights, at least two of the respective vector lengths are different, and the first machine learning device employs the respective vector lengths, to identify the compressed gradient weights in the second concatenated compressed gradient weight vector;
   employing, by the first machine learning device, the respective vector lengths to identify the compressed gradient weights in the second concatenated compressed gradient weight vector;
   updating, by the first machine learning device, a weight of the first machine learning device using the identified compressed gradient weights of the received second concatenated compressed gradient weight vector; and performing, by the first machine learning device, a first machine learning task using the updated weight.

8. The computer-implemented method of claim 7, receiving, by the first machine learning device, from the parameter server, the first concatenated compressed gradient weight vector.

9. The computer-implemented method of claim 7, further comprising:
sending, by the first machine learning device, a compressed gradient weight to the parameter server.

10. The computer-implemented method of claim 7, wherein the second concatenated compressed gradient weight vector comprises a windowed concatenated compressed gradient weight having only the compressed gradient weights, thereby facilitating improved processing efficiency associated with a processor of the first machine learning device.

11. The computer-implemented method of claim 7, wherein the distributed machine learning system comprises at least one of an asynchronous machine learning system an asynchronous stochastic gradient descent system.

12. The computer-implemented method of claim 7, further comprising:
after the updating, sending, by the first machine learning device, a compressed gradient weight, based on the weight, to the parameter server.

13. A computer program product facilitating a gradient weight compression process, the computer program product comprising a computer readable storage medium having program instructions embodied therewith, the program instructions executable by a processor to cause the processor to:
identify, by the processor, compressed gradient weights, from a first group of second learning entities of a distributed machine learning system, not present in a first concatenated compressed gradient weight vector for a first learning entity of the distributed machine learning system, wherein the first concatenated compressed gradient weight vector is based on other compressed gradient weights from a second group of second learning entities of the distributed machine learning system, and that was previously sent to the first learning entity, and wherein the first group of second learning entities is less than an entirety of second learning entities of the distributed machine learning system and is different from the second group of second learning entities;
compute, by the processor, a second concatenated compressed gradient weight vector for the first learning entity, based on a function that uses the compressed gradient weights and does not use any compressed gradient weights employed to generate the first concatenated compressed gradient weight vector, to update a weight of the first learning entity, wherein the second concatenated compressed gradient weight vector comprises a concatenation of the compressed gradient weights; and
transmit, by the processor, via a network, to the first learning entity
a first transmission comprising information identifying respective vector lengths of the compressed gradient weights in the second concatenated compressed gradient weight vector, wherein the second concatenated compressed gradient weight vector comprises a plurality of compressed gradient weights, at least two of the respective vector lengths are different, and the first learning entity employs the respective vector lengths, to identify the compressed gradient weights in the second concatenated compressed gradient weight vector, and
a second transmission comprising the second concatenated compressed gradient weight vector to initiate the first learning entity to update the weight of the first learning entity using the second concatenated compressed gradient weight vector.

14. The computer program product of claim 13, wherein the program instructions are further executable by the processor to cause the processor to:
identify, by the processor, the compressed gradient weights based on a first timestamp corresponding to the first concatenated compressed gradient weight vector and respective second timestamps corresponding respectively to the compressed gradient weights.

15. The computer program product of claim 13, wherein the program instructions are further executable by the processor to cause the processor to:
compute, by the processor, the first concatenated compressed gradient weight vector based on second compressed gradient weights of the second group of second learning entities of the distributed machine learning system.

16. The computer program product of claim 13, wherein the program instructions are further executable by the processor to cause the processor to:
encode, by the processor, a timestamp on the first concatenated compressed gradient weight vector.

17. The computer program product of claim 13, wherein the second concatenated compressed gradient weight vector comprises a windowed concatenated compressed gradient weight having only the compressed gradient weights.

18. The computer program product of claim 13, wherein the distributed machine learning system comprises at least one of an asynchronous machine learning system or an asynchronous stochastic gradient descent system.

19. The computer program product of claim 13, wherein the program instructions are further executable by the processor to cause the processor to:
encode, by the processor, a timestamp on the second concatenated compressed gradient weight vector.

* * * * *